US008648969B2

(12) United States Patent
Matsui

(10) Patent No.: US 8,648,969 B2

(45) Date of Patent: Feb. 11, 2014

(54) BRIGHTNESS ADJUSTING DEVICE, DISPLAY DEVICE, COMPUTER-READABLE RECORDING MEDIUM, AND BRIGHTNESS ADJUSTING METHOD

(75) Inventor: Katsuyuki Matsui, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 374 days.

(21) Appl. No.: 12/734,494

(22) PCT Filed: Nov. 19, 2008

(86) PCT No.: PCT/JP2008/070993

§ 371 (c)(1), (2), (4) Date: May 5, 2010

(87) PCT Pub. No.: WO2009/066680

PCT Pub. Date: May 28, 2009

(65) Prior Publication Data

US 2011/0043705 A1 Feb. 24, 2011

(51) Int. Cl.

*H04N 5/57* (2006.01)

*G09G 3/36* (2006.01)

(52) U.S. Cl.

USPC .......... 348/687; 345/102

(58) Field of Classification Search

USPC .......... 348/687

See application file for complete search history.

(56) References Cited

U.S. PATENT DOCUMENTS

| | | | | |
|---|---|---|---|---|
| 6,597,338 | B2 | 7/2003 | Onodera | |
| 7,522,134 | B2 | 4/2009 | Mizumaki | |
| 2002/0057252 | A1* | 5/2002 | Onodera | 345/102 |
| 2004/0223007 | A1 | 11/2004 | Mamata | |
| 2005/0264549 | A1 | 12/2005 | Mizumaki | |
| 2006/0077214 | A1* | 4/2006 | Tsou et al. | 345/690 |
| 2007/0146294 | A1* | 6/2007 | Nurmi et al. | 345/102 |
| 2008/0158113 | A1* | 7/2008 | Ozawa | 345/77 |

FOREIGN PATENT DOCUMENTS

| | | | |
|---|---|---|---|
| CN | 101211531 | A | 7/2008 |
| EP | 1600934 | A2 | 11/2005 |
| JP | 11-194736 | A | 7/1999 |
| JP | 2005-338262 | A | 12/2005 |
| JP | 2008-164766 | A | 7/2008 |
| TW | 200612364 | A | 4/2006 |

OTHER PUBLICATIONS

Chinese Office Action dated Nov. 24, 2011, with English translation.
Chinese Office Action dated May 21, 2012, with English translation.

* cited by examiner

*Primary Examiner* — Jefferey Harold
*Assistant Examiner* — Michael Teitelbaum
(74) *Attorney, Agent, or Firm* — McGinn Intellectual Property Law Group, PLLC

(57) ABSTRACT

A brightness adjusting device of the present invention includes: a brightness setting section that accepts input of brightness change information that is an instruction to change a brightness setting value; a brightness adjusting section that performs brightness adjustment by either one of a first brightness adjusting unit and a second brightness adjusting unit having different characteristics from each other, in accordance with the instruction that is input from the brightness setting section; a determining section that determines whether or not the brightness adjustment of the brightness adjusting section switches from the first brightness adjusting unit to the second brightness adjusting unit; and an output section that outputs an alarm when the brightness adjustment of the brightness adjusting section is determined to switch from the first brightness adjusting unit to the second brightness adjusting unit based on a determination result of the determining section.

12 Claims, 3 Drawing Sheets

BRIGHTNESS ADJUSTING DEVICE, DISPLAY DEVICE, COMPUTER-READABLE RECORDING MEDIUM, AND BRIGHTNESS ADJUSTING METHOD

TECHNICAL FIELD

The present invention relates to a brightness adjusting device, a display device, a computer-readable recording medium, and a brightness adjusting method that performs brightness adjustment by using an adjusting means with differing characteristics such as video signal adjustment and backlight adjustment.

BACKGROUND ART

Conventionally, it has been desired to be able to adjust the screen brightness of a display device over a wide range from "bright" to "dark" in accordance with the brightness of a room or the liking of the viewer. In liquid crystal displays among display devices, as a method of adjusting the brightness of the screen, for example, there are the two types of "backlight (B/L) adjustment" and "video signal adjustment".

In video signal adjustment, brightness adjustment is performed by for example changing the gradation with respect to the video picture that is displayed on a screen. In the case of having performed this video signal adjustment, it is accompanied by degradation of image quality. Therefore, it is desired that this adjustment method not be used as much as possible. On the other hand, in B/L adjustment, brightness adjustment is performed by modulating the light source.

The B/L adjustment has an advantage of little degradation of the image quality of the video image that is displayed, but on the other hand, the range of being able to adjust brightness is narrow. Therefore, in this B/L adjustment, the brightness of the screen cannot be made darker or brighter than a certain value.

Therefore, an apparatus has been provided that adjusts the brightness by combining video signal adjustment and the B/L adjustment as shown in the art of Patent Document 1 given below.

[Patent Document 1] Japanese Unexamined Patent Application, First Publication No. H11-0194736

DISCLOSURE OF INVENTION

Problem to be Solved by the Invention

However, in the liquid crystal display device shown in Patent Document 1, among the video signal adjustment and the B/L adjustment, in the case of performing video signal adjustment, degradation occurs such as whitening, darkening, and reduction in the number of colors. For this reason, for a user that places viewing importance on the gradations of the displayed video, when performing brightness adjustment that combines the video signal adjustment and the B/L adjustment, although thinking that the B/L adjustment is being performed, when the video signal adjustment is performed, the problem arises of causing video signal degradation. Also, there is the requirement of wanting to set a maximum/minimum brightness at which image quality degradation does not occur. For this reason, it is desired to inform the user of the brightness at which the adjusting method changes.

The present invention has been achieved in view of the above circumstances. An object of the present invention is to provide a brightness adjusting device, a display device, a computer-readable recording medium, and a brightness adjusting method that is capable of informing a user whether or not there is a switch to brightness adjustment having differing characteristics when performing brightness adjustment.

Means for Solving the Problem

In order to solve the abovementioned problems, a brightness adjusting device according to a first aspect of the present invention includes: a brightness setting section that accepts input of brightness change information that is an instruction to change a brightness setting value; a brightness adjusting section that performs brightness adjustment by either one of a first brightness adjusting unit and a second brightness adjusting unit having different characteristics from each other, in accordance with the instruction that is input from the brightness setting section; a determining section that determines whether or not the brightness adjustment of the brightness adjusting section switches from the first brightness adjusting unit to the second brightness adjusting unit; and an output section that outputs an alarm when the brightness adjustment of the brightness adjusting section is determined to switch from the first brightness adjusting unit to the second brightness adjusting unit based on a determination result of the determining section.

In the brightness adjusting device according to the first aspect of the present invention, the output section may display a warning on a screen of a display device in which the brightness adjusting device is provided.

In the brightness adjusting device according to the first aspect of the present invention, the brightness adjusting section may stop brightness change even if brightness change information is input from the brightness setting section when the brightness adjustment of the brightness adjusting section is determined to switch from the first brightness adjusting unit to the second brightness adjusting unit based on the determination result of the determining section.

The brightness adjusting device according to the first aspect of the present invention may further include a storage section that stores a reference value that is a brightness setting value in a case of the brightness adjustment switching from the first brightness adjusting unit to the second brightness adjusting unit, and the determining section may determine whether or not the brightness setting value of the brightness change information that is input from the brightness setting section and the reference value that is stored in the storage section agree, and in a case of the brightness setting value and the reference value agreeing, may determine whether or not input of a brightness setting value in which the brightness adjustment switches from the first brightness adjusting unit to the second brightness adjusting unit is made from the brightness setting section, and in a case of input of the brightness setting value in which the brightness adjustment switches from the first brightness adjusting unit to the second brightness adjusting unit being further input, may determine that the brightness adjustment of the brightness adjusting section switches from the first brightness adjusting unit to the second brightness adjusting unit.

A display device according to a second aspect of the present invention includes: a brightness setting section that accepts input of brightness change information that is an instruction to change a brightness setting value; a brightness adjusting section that performs brightness adjustment by either one of a first brightness adjusting unit and a second brightness adjusting unit having different characteristics from each other, in accordance with the instruction that is input from the brightness setting section; a determining section that determines whether or not the brightness adjustment of the brightness adjusting section switches from the first brightness adjusting unit to the second brightness adjusting unit; and an output section that outputs an alarm when the brightness adjustment of the brightness adjusting section is determined to switch from the first brightness adjusting unit to the second brightness adjusting unit based on a determination result of the determining section.

A computer-readable recording medium according to a third aspect of the present invention stores a computer program that causes a computer to function as a brightness setting section that accepts input of brightness change information that is an instruction to change a brightness setting value; an adjusting section that performs brightness adjustment by either one of a first brightness adjusting unit and a second brightness adjusting unit having different characteristics from each other, in accordance with the instruction that is input from the brightness setting section; a determining section that determines whether or not the brightness adjustment of the brightness adjusting section switches from the first brightness adjusting unit to the second brightness adjusting unit; and an output section that outputs an alarm when the brightness adjustment of the brightness adjusting section is determined to switch from the first brightness adjusting unit to the second brightness adjusting unit based on a determination result of the determining section.

A brightness setting method according to a fourth aspect of the present invention includes: a brightness setting step of accepting input of brightness change information that is an instruction to change a brightness setting value; an adjusting step of performing brightness adjustment by either one of a first brightness adjusting unit and a second brightness adjusting unit having different characteristics from each other, in accordance with the instruction that is input by the brightness setting step; a determining step of determining whether or not the brightness adjustment of the adjusting step switches from the first brightness adjusting unit to the second brightness adjusting unit; and an output step of outputting an alarm when the brightness adjustment of the adjusting step is determined to switch from the first brightness adjusting unit to the second brightness adjusting unit based on a determination result of the determining step.

Effect of the Invention

As described above, according to this invention, a brightness change is input, and a determination is made whether or not the brightness adjustment switches from a first brightness adjusting unit to a second brightness adjusting unit means, and in the case of the brightness adjustment switching from the first brightness adjusting unit to the second brightness adjusting unit, performs an alarm. Thereby, it is possible to notify a user of a switch to a brightness adjusting unit with differing characteristics

REFERENCE SYMBOLS

Figure 1:
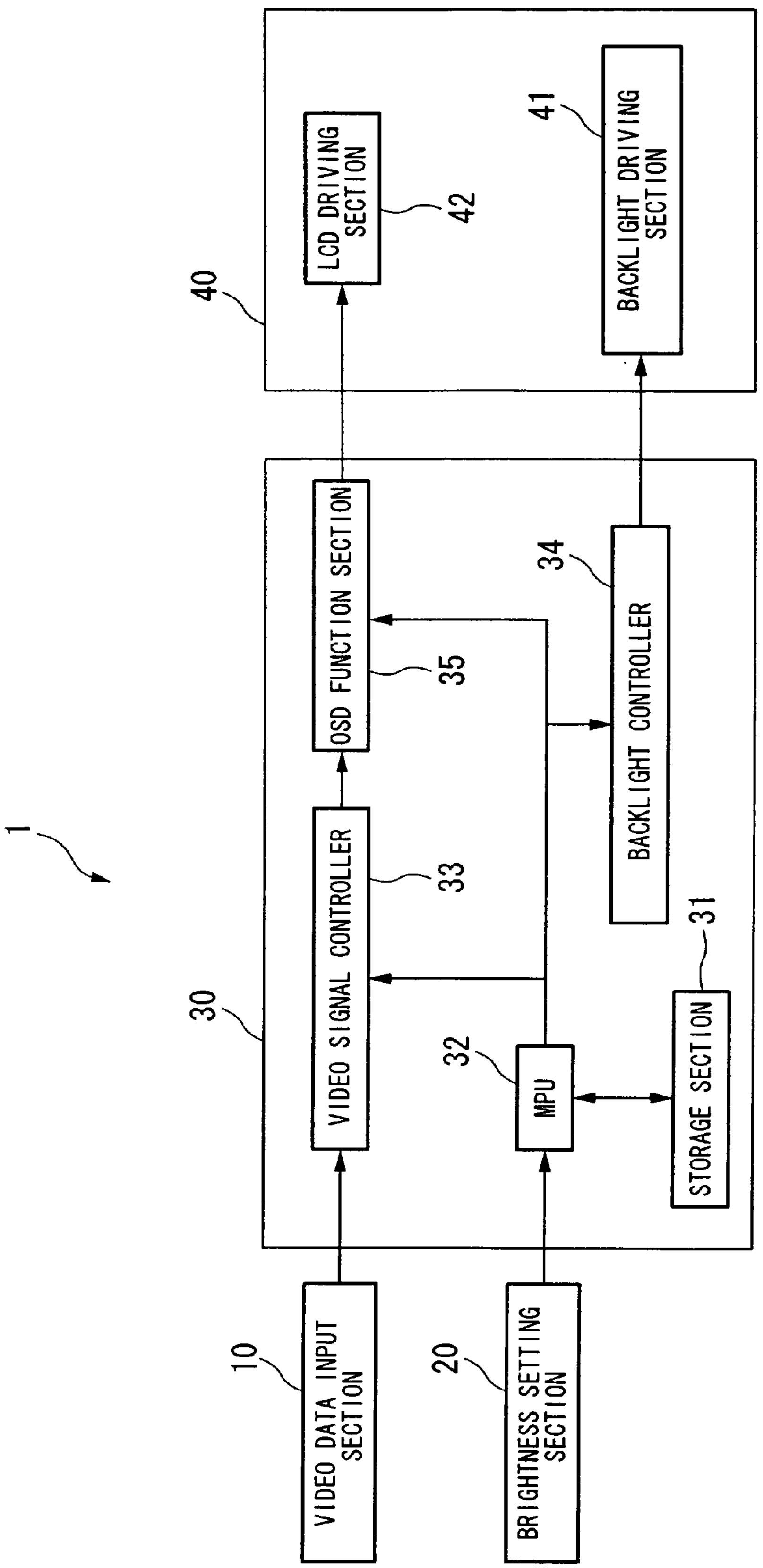
FIG. 1 is an outline block diagram that shows the constitution of a liquid crystal device in which a brightness adjusting device according to one embodiment of the present invention is applied.

1 Liquid crystal display device
10 Video data input section
20 Brightness setting section
30 Control unit
31 Storage section
32 MPU
33 Video gain control
34 Backlight controller
35 OSD function section
40 Liquid crystal display section
41 Backlight driving section
42 LCD driving section

BEST MODE FOR CARRYING OUT THE INVENTION

Herinbelow, a brightness adjusting device according to one embodiment of the present invention shall be described with reference to the accompanying drawings. FIG. 1 is a schematic block diagram that shows the constitution of a liquid crystal display device in which the brightness adjusting device according to one embodiment of the present invention is applied.

A liquid crystal display device 1 has a video data input section 10, a brightness setting section 20, a control unit 30, and a liquid crystal display section 40. The combination of the brightness setting section 20 and the control unit 30 corresponds to the brightness adjusting device.

The video data input section 10 outputs a video signal according to image data to the control unit 30. The brightness setting section 20 receives the input of brightness change information, which is an instruction to change a brightness setting value, that is input via a switch that is provided in the liquid crystal display device 1. The input of this brightness change information is for example performed by a button that increases (raises) the brightness setting value or a button that reduces (lowers) the brightness setting value that is currently set being pressed by the user, and the signal that corresponds to the button that has been depressed being input to the control unit 30.

The control unit 30 performs brightness adjustment in accordance with the setting value of the brightness inputted by the brightness setting section 20, and displays on the liquid crystal display section 40 an image according to the video signal outputted from the video data input section 10. There are various types of brightness adjusting means (brightness adjusting units). In this embodiment, a description of brightness adjustment shall be given, using as an example the case of applying an adjusting method of video signal adjustment that raises or lowers the gradation of the video signal that is input from the video data input section 10 and of backlight adjustment that raises or lowers the brightness of the backlight.

In the liquid crystal display section 40, a liquid crystal display panel is provided. The liquid crystal display section 40 displays an image in accordance with the brightness corresponding to the instruction from the control unit 30.

Next, in the control unit 30, a storage section 31 stores a brightness reference value that is a brightness setting value in case of the brightness adjustment switching from backlight adjustment to video signal adjustment. This brightness setting value is a value of a range of 0 to 100%, for example. Any value among the values in this range is set as a brightness reference value.

An MPU (Micro Processing Unit) 32 has a function that controls each part of the liquid crystal display device 1. Furthermore, the MPU 32 has a function that performs brightness adjustment by either video signal adjustment or backlight adjustment in accordance with an instruction inputted from the brightness setting section 20, and a function that determines whether or not the brightness adjustment of the brightness adjusting section 20 switches from backlight adjustment to video signal adjustment.

The MPU 32 has a function that stops change of brightness even if brightness change information is inputted from the brightness setting section 20 when it has judged that the brightness adjustment has switched from backlight adjustment to video signal adjustment, and a function that determines whether or not the brightness setting value of the brightness change information that is input from the brightness setting section 20 and the brightness reference value stored in storage section 31 are in agreement, and in the case of those values agreeing, determines whether or not the brightness setting value that performs the brightness adjustment by video signal adjustment has been input from the brightness setting section 20, and in the case the brightness setting value that performs the brightness adjustment by video signal adjustment being input, detects the brightness adjustment of the brightness adjusting section 20 switching from backlight adjustment to video signal adjustment. This MPU 32 corresponds to the abovementioned brightness adjusting section and the determining section.

A video signal controller 33 outputs the video signal to be input from the video data input section 10 to an OSD (on-screen display) function section 35. In the case of an instruction of video signal adjustment being inputted from the MPU 32, the video signal controller 33 changes the gradation of the video signal in accordance with the instruction, and outputs it to the OSD function section 35.

A backlight controller 34 changes the control signal that drives a backlight driving section 41 in accordance with the instruction from the MPU 32. As this control signal, for example, when the backlight of the liquid crystal display section 40 is a current-modulated light type, the actual value of the current to be supplied is changed. When a light source is an LED, the pulse width of the voltage to be supplied is changed, or the peak value of the voltage is changed.

The OSD function section 35 outputs the video signal that is output from the video signal controller 33 to an LCD (liquid crystal display) driving section 42 and drives the liquid crystal panel with the LCD driving section 42 to perform the display of various information. In the case of there being a need to display various setting screens such as in the case of a brightness change instruction being input from the brightness setting section 20, the OSD function section 35 outputs a video signal to the LCD driving section 42 that causes the setting screen to be displayed overlapping the image due to this video signal by using the OSD function.

The OSD function section 35 outputs an alarm in the case of the MPU 32 having determined that brightness adjustment switches from backlight adjustment to video signal adjustment based on the determination result of the MPU 32. The output method of this alarm includes outputting an alarm at any position on the screen of the liquid crystal display section 40, outputting an alarm on the OSD screen, or changing the display color of the adjustment slider that is displayed on the OSD. This OSD function section 35 corresponds to the abovementioned output section.

The liquid crystal display section 40 has the backlight driving section 41 and the LCD driving section 42, and displays an image on the liquid crystal panel in accordance with the instructions from these driving sections. The backlight driving section 41 makes the backlight turn on so as to become the brightness according to the control signal that is supplied from the backlight controller 34. The LCD driving section 42 drives the liquid crystal panel to display an image in accordance with the video signal that is output from the OSD function section 35.

Figure 2:
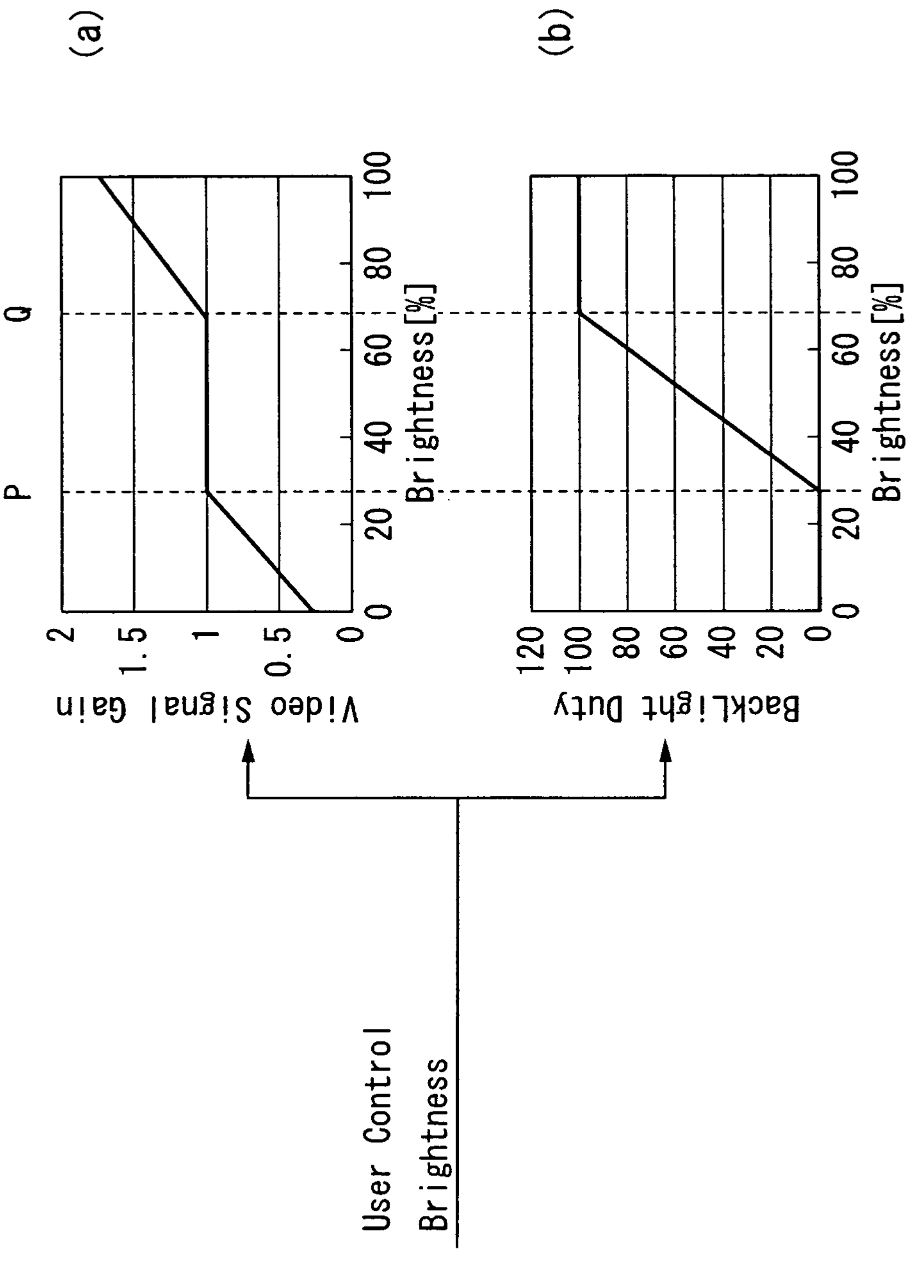
FIG. 2 is a diagram that shows an example of data that is stored in a storage section shown in FIG. 1.

FIG. 2 is a diagram that shows an example of the data that is stored in the storage section 31. In this diagram, the storage section 31 stores the video signal brightness adjustment data in the case of performing video signal adjustment shown in the section (a) of FIG. 2, and backlight brightness adjustment data in the case of performing backlight adjustment shown in the section (b) of FIG. 2.

The brightness setting value (Brightness) and the video signal gain are related to each other and stored in the video signal brightness adjustment data. The brightness setting value (Brightness) and the backlight duty ratio are related to each other and stored in the backlight brightness adjustment data.

Reference values P and Q that show which of video signal adjustment and backlight adjustment is performed for brightness are stored in the brightness setting value of the video signal brightness adjustment data and the backlight brightness adjustment data. When the brightness setting value is in a range from 0 to less than the reference value P, brightness adjustment is performed by video signal adjustment. When the brightness setting value is in a range from the reference value P to the reference value Q, brightness adjustment is performed by backlight adjustment. When the brightness setting value is in a range from a value that exceeds the reference value Q to 100, brightness adjustment is performed by video signal adjustment. In this way, with the brightness setting value in a range of 0 to 100, it is possible to adjust the brightness by either one adjustment method among video signal adjustment and backlight adjustment by giving an instruction of brightness adjustment. The reference value P and the reference value Q correspond to the brightness setting values at which the adjustment method switches.

Figure 3:
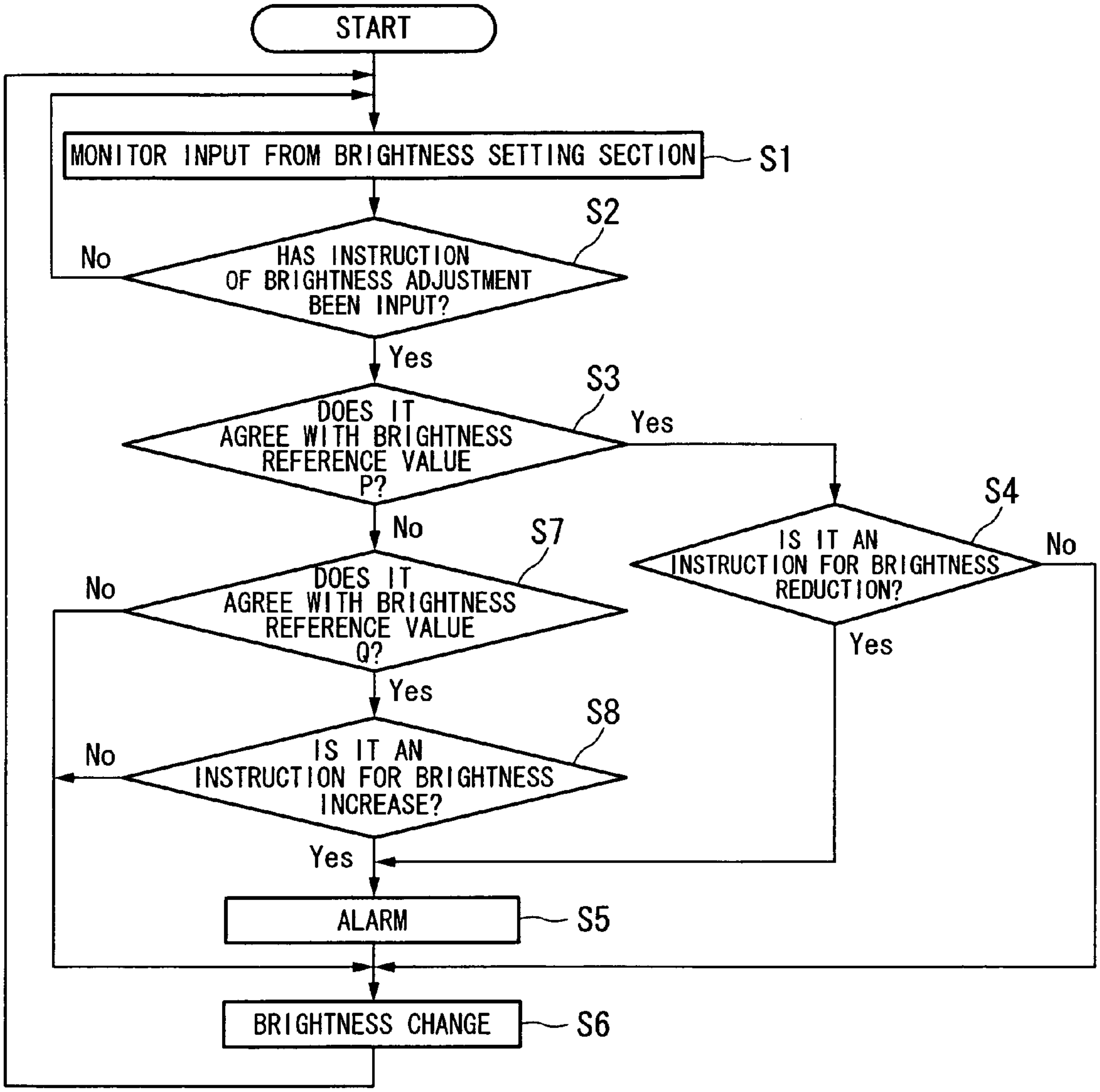
FIG. 3 is a flowchart that describes the operation of the brightness adjusting device shown in FIG. 1.

Next, the operation of the aforementioned brightness adjusting device shall be described using the flowchart of FIG. 3.

The description shall be given for the case of a brightness setting value in which the brightness value is between the reference value P and the reference value Q being set as the initial value.

First, the MPU 32 monitors the presence of an input of an instruction of brightness change from the brightness setting section 20 (Step S1), and determines whether or not an instruction of brightness adjustment has been input (Step S2). If an instruction of brightness adjustment has not been input, the process proceeds to Step S1. On the other hand, if an instruction of brightness adjustment has been input, the MPU 32 determines whether or not the instruction of brightness adjustment that has been input, that is, the brightness setting value that has been instructed, agrees with the value of the reference value P (Step S3). In the case of the brightness setting value that has been input agreeing with the reference value P, the MPU 32 determines whether or not the brightness setting value that has been input is a value that is less than the current brightness setting value (Step S4). In the case of the brightness setting value that has been input being a lesser value, the MPU 32 outputs an instruction to perform an alarm to the OSD function section 35 (Step S5). Thereby, an alarm is shown on the liquid crystal display section 40 by the OSD function of the OSD function section 35. After the output of the alarm, the MPU 32 performs a change to the brightness corresponding to the brightness setting value that has been input (Step S6).

On the other hand, in the Step S3, in the case that the brightness setting value that has been input does not match the reference value P, the MPU 32 determines whether or not this brightness setting value matches the reference value Q (Step S7). In the case of the brightness setting value that has been input not matching the reference value Q, the MPU 32 makes the brightness setting value that was input the current brightness setting value, and performs brightness adjustment so as to become the brightness of this brightness setting value (Step S6). On the other hand, in the case of the brightness setting value that has been input matching the reference value Q, the MPU 32 determines whether or not the brightness setting value that has been input is a value that is greater than the brightness setting value that is currently set (Step S8). In the case of the brightness setting value that has been input being a greater value, the MPU 32 outputs an instruction to perform an alarm to the OSD function section 35 (Step S5). Thereby, an alarm is shown on the liquid crystal display section 40 by the OSD function of the OSD function section 35. After the output of the alarm, the MPU 32 performs a change to the brightness corresponding to the brightness setting value that has been input (Step S6).

In this way, in the case of the determination of YES in Step S4 and the case of the determination of YES in Step S8, the switching of the brightness adjustment from backlight adjustment to video signal adjustment is detected, and an alarm is performed. Thereby, it is possible to inform the user of the fact that brightness adjustment is performed by video signal adjustment.

Note that in the embodiment described above, without changing the brightness directly after performing an alarm, it may be made so as to not accept an input of a change of the brightness setting value during a fixed time, or not accept the input of a change of the brightness setting value until the input of a certain operation.

For example, brightness adjustment may be performed as follows. When the user presses a "brightness reduction" button of the brightness setting section 20 to perform the input of the brightness setting value that shows the "brightness reduction", an alarm is performed immediately before starting the brightness adjustment by video signal adjustment. When the user releases the "brightness reduction" button of the brightness setting section 20 and presses the "brightness reduction" button one more time, brightness adjustment that causes brightness reduction is performed by video signal adjustment.

Also, brightness adjustment may also be performed in the following manner. When the user continues to press the "brightness reduction" button of the brightness setting section 20 to perform the input of the brightness setting value that shows "brightness reduction", an alarm is performed immediately before starting the brightness adjustment by video signal adjustment. When the user additionally continues to press the "brightness reduction" button of the brightness setting section 20, and a fixed period of time has elapsed, brightness adjustment that causes brightness reduction is performed by video signal adjustment.

Thereby, it is possible to perform brightness adjustment with making the user recognize that brightness adjustment by video signal adjustment has been started.

In the embodiment as described above, the case was described of performing an alarm when the brightness adjustment switches from backlight adjustment to video signal adjustment. However, it is not limited thereto, and an alarm may be performed when the brightness adjustment switches from video signal adjustment to backlight adjustment. Also, an alarm may be performed in the following manner. Setting values of ranges that the respective methods of backlight adjustment and video signal adjustment have are stored in the storage section in correspondence to the brightness adjustment method. In the case of a certain brightness setting value having been input, it is determined whether or not the brightness adjustment method prior to the setting value input or the brightness adjustment method after the setting value input switches, and in the case of switching, an alarm may be performed. Thereby, it is also possible to perform notification of switching from the video signal adjustment to backlight adjustment, and it is possible to notify that it is the setting of the maximum or minimum brightness at which image degradation does not occur.

The input of the brightness setting value by the user is not necessarily limited to input by continuous up and down button operation. In the case of a brightness target value that crosses a brightness reference value being directly input as a target by the user, it is determined whether that value that was input is a brightness setting value in the range in which the brightness adjustment method switches between before and after the input.

In the embodiment described above, the brightness adjustment method was described in the case of applying the two types of the video adjustment and the backlight adjustment, but other brightness adjustment methods may also be applied.

This brightness adjustment method differs depending on the display device. If the target of performing brightness adjustment is a liquid crystal display, as described above, "backlight adjustment" and "gradation adjustment (video signal adjustment)" are given as examples of the brightness adjustment method. If the target of performing brightness adjustment is a plasma display, "discharge voltage" and "discharge time adjustment (video signal adjustment)" are given as examples. Each of the former has a little image quality degradation, such as gradation reduction. However, in the case of performing backlight adjustment, if the backlight is made too dark, flickering and non-lighting occur. Therefore, brightness adjustment in a fixed range is performed using backlight adjustment, and adjustment using another adjustment method is performed as required. When performing brightness adjustment by discharge voltage, if the discharge voltage is dropped to below a fixed value, the discharge will stop. Therefore, brightness adjustment is performed using this adjustment method within the range in which discharge is performed, and brightness adjustment is performed by switching to discharge time adjustment (video signal adjustment) as required.

A program for realizing the function of the liquid crystal display device 1 in FIG. 1 is recorded on a computer-readable recording medium, and by reading the program that is recorded on this recording medium into a computer system and running it, brightness adjustment may be performed. Note that a "computer system" here includes an operating system and hardware such as peripheral devices.

In the case of using a WWW system, a "computer system" includes a home page providing environment (or display environment).

The "computer-readable recording medium" means a portable medium such as a flexible disk, magneto-optical disk, ROM, CD-ROM and the like, and a storage device such as a hard disk that is housed in a computer system. The "computer-readable recording medium" also includes one that dynamically holds a program for a short time such as a communication line for transmitting a program through a network such as the Internet or the like or a communication line such as a telephone line or the like, and also includes one that holds the program for a certain time, such as a volatile memory in a computer system which functions as a server or client. The abovementioned program may be one for realizing a section of the abovementioned functions, and it is also possible to realize the abovementioned functions in combination with a program that has already been stored in the computer system.

The present invention was described above with reference to the embodiments, but the present invention is not limited to the above described embodiments. Various modifications that will be recognized by one of ordinary skill in the art can be made within the scope of the present invention to the constitution and details of the present invention.

INDUSTRIAL APPLICABILITY

The present invention can be applied to a brightness adjusting device that performs brightness adjustment using adjusting means having differing characteristics such as video signal adjustment and backlight adjustment. With this brightness adjusting device, when performing brightness adjustment, it is possible to inform a user whether or not a switch is made to brightness adjustment having different characteristics.

Priority is claimed on Japanese Patent Application No. 2007-299867, filed Nov. 19, 2007, the content of which is incorporated herein by reference.

The invention claimed is:

1. A brightness adjusting device, comprising:

a brightness setting section that accepts an input of brightness change information that comprises an instruction to change a brightness setting value;

a brightness adjusting section that performs a brightness adjustment by one of a brightness adjusting unit and a video signal adjusting unit having different characteristics from each other, in accordance with an instruction that is input from the brightness setting section;

a determining section that determines whether the brightness adjustment of the brightness adjusting section switches from the brightness adjusting unit to the video signal adjusting unit;

an output section that outputs an alarm when the brightness adjustment of the brightness adjusting section is determined to switch from the brightness adjusting unit to the video signal adjusting unit based on a determination result of the determining section; and a storage section that stores first and second reference values comprising brightness setting values in cases of the brightness adjustment switching between the brightness adjusting unit and the video signal adjusting unit, the first reference value being less than the second reference value, wherein the brightness adjusting section performs a brightness adjustment by the video signal adjusting unit in a case where the brightness change information from the brightness setting section is in a range from a minimum value to the first reference value and in a range from the second reference value to a maximum value, and the brightness adjusting section performs a brightness adjustment by the brightness adjusting unit in a case where the brightness change information from the brightness setting section is in a range from the first reference value to the second reference value.

2. The brightness adjusting device according to claim 1, wherein the output section displays a warning on a screen of a display device in which the brightness adjusting device is provided.

3. The brightness adjusting device according to claim 1, wherein the brightness adjusting section stops a brightness change until an elapse of a fixed time or until an input of a certain operation, even if the brightness change information is input from the brightness setting section when the brightness adjustment of the brightness adjusting section is determined to switch from the brightness adjusting unit to the video signal adjusting unit based on the determination result of the determining section.

4. A non-transitory computer-readable recording medium that stores a computer program that causes a computer to function as:

a brightness setting section that accepts an input of brightness change information that comprises an instruction to change a brightness setting value;

an adjusting section that performs brightness adjustment by one of a brightness adjusting unit and a video signal adjusting unit having different characteristics from each other, in accordance with an instruction that is input from the brightness setting section;

a determining section that determines whether the brightness adjustment of the brightness adjusting section switches from the brightness adjusting unit to the video signal adjusting unit;

an output section that outputs an alarm when the brightness adjustment of the brightness adjusting section is determined to switch from the brightness adjusting unit to the video signal adjusting unit based on a determination result of the determining section; and a storage section that stores first and second reference values comprising brightness setting values in cases of the brightness adjustment switching between the brightness adjusting unit and the video signal adjusting unit, the first reference value being less than the second reference value, wherein the brightness adjusting section performs a brightness adjustment by the video signal adjusting unit in a case where the brightness change information from the brightness setting section is in a range from a minimum value to the first reference value and in a range from the second reference value to a maximum value, and the brightness adjusting section performs a brightness adjustment by the brightness adjusting unit in a case where the brightness change information from the brightness setting section is in a range from the first reference value to the second reference value.

5. A brightness setting method, comprising:

a brightness setting of accepting an input of brightness change information that comprises an instruction to change a brightness setting value;

performing a brightness adjustment by one of a brightness adjusting unit and a video signal adjusting unit having different characteristics from each other, in accordance with an instruction that is input by the brightness setting;

determining whether the brightness adjustment switches from the brightness adjusting unit to the video signal adjusting unit;

outputting an alarm when the brightness adjustment is determined to switch from the brightness adjusting unit to the video signal adjusting unit based on a determination result of the determining; and storing first and second reference values comprising brightness setting values in cases of the brightness adjustment switching between the brightness adjusting unit and the video signal adjusting unit, the first reference value being less than the second reference value, wherein a brightness adjustment is performed by the video signal adjusting unit in a case where the brightness change information from the brightness setting is in a range from a minimum value to the first reference value and in a range from the second reference value to a maximum value, and a brightness adjustment is performed by the brightness adjusting unit in a case where the brightness change information from the brightness setting is in a range from the first reference value to the second reference value.

6. The brightness adjusting device according to claim 1, wherein, when the brightness change information is input from the brightness setting section when the brightness adjustment of the brightness adjusting section is determined to switch from the brightness adjusting unit to the video signal adjusting unit based on the determination result of the determining section, the brightness adjusting section stops a brightness change.

7. The non-transitory computer-readable recording medium according to claim 4, wherein the brightness adjusting section stops a brightness change until an elapse of a fixed time or until an input of a certain operation, even if the brightness change information is input from the brightness setting section when the brightness adjustment of the brightness adjusting section is determined to switch from the brightness adjusting unit to the video signal adjusting unit based on the determination result of the determining section.

8. The non-transitory computer-readable recording medium according to claim 4, wherein, when the brightness change information is input from the brightness setting section when the brightness adjustment of the brightness adjusting section is determined to switch from the brightness adjusting unit to the video signal adjusting unit based on the determination result of the determining section, the brightness adjusting section stops a brightness change.

9. The method according to claim 5, wherein the brightness adjustment stops a brightness change until an elapse of a fixed time or until an input of a certain operation, even if the brightness change information is input from the brightness adjustment when the brightness adjustment is determined to switch from the brightness adjusting unit to the video signal adjusting unit based on the determination result.

10. The brightness adjusting device according to claim 1, wherein, between the minimum value and the maximum value, the brightness adjusting section performs only one of the brightness adjustment by the video signal adjusting unit and the brightness adjustment by the brightness adjusting unit.

11. The brightness adjusting device according to claim 1, wherein the brightness adjusting section performs the brightness adjustment only by the video signal adjusting unit in a case where the brightness change information from the brightness setting section is in the range from the minimum value to the first reference value or in the range from the second reference value to a maximum value.

12. The brightness adjusting device according to claim 1, wherein the brightness adjusting section performs the brightness adjustment only by the brightness adjusting unit in the case where the brightness change information from the brightness setting section is in the range from the first reference value to the second reference value.

* * * * *